Dec. 6, 1960 R. C. BEEH 2,963,585
NON-CONTACTING THICKNESS GAUGES
Filed July 21, 1955 3 Sheets-Sheet 1
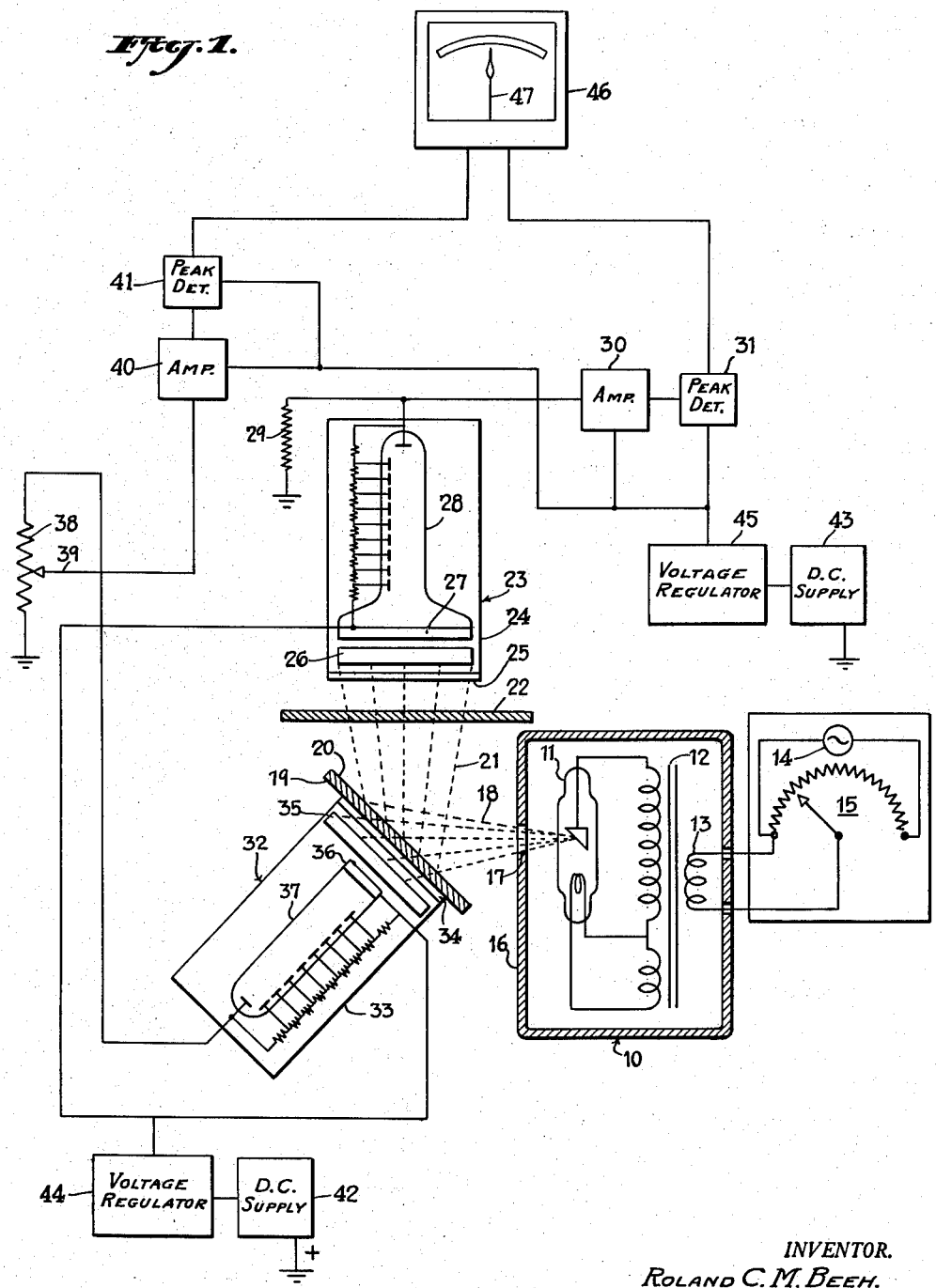
INVENTOR.
ROLAND C. M. BEEH.
BY Ward, Neal, Haselton,
Orme & McElhannon
ATTORNEYS.

Dec. 6, 1960  R. C. BEEH  2,963,585
NON-CONTACTING THICKNESS GAUGES
Filed July 21, 1955  3 Sheets-Sheet 2
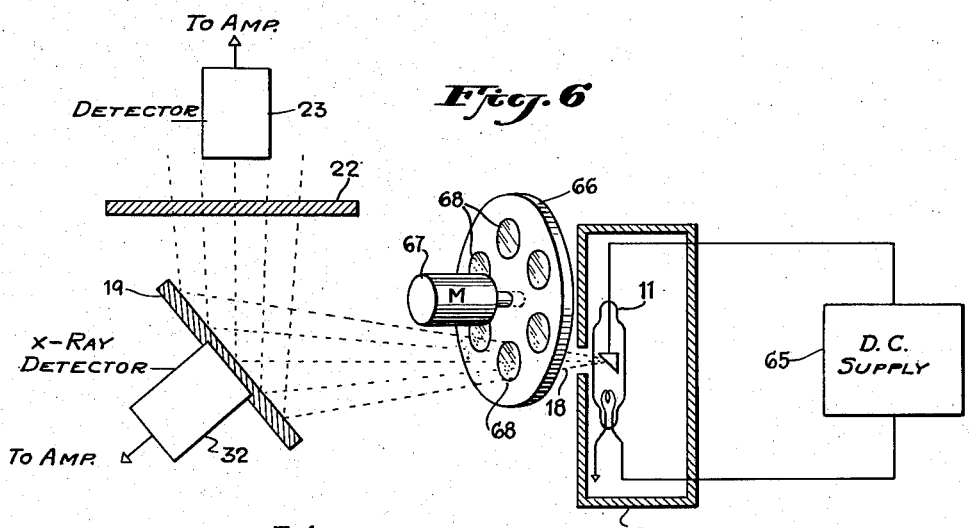
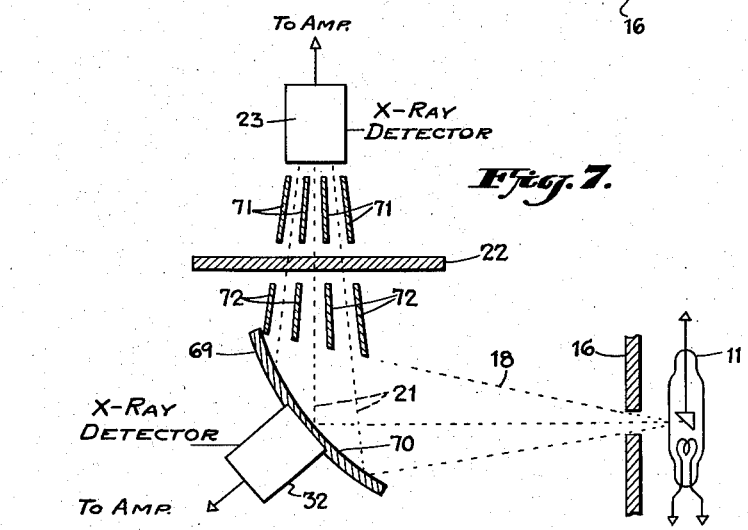
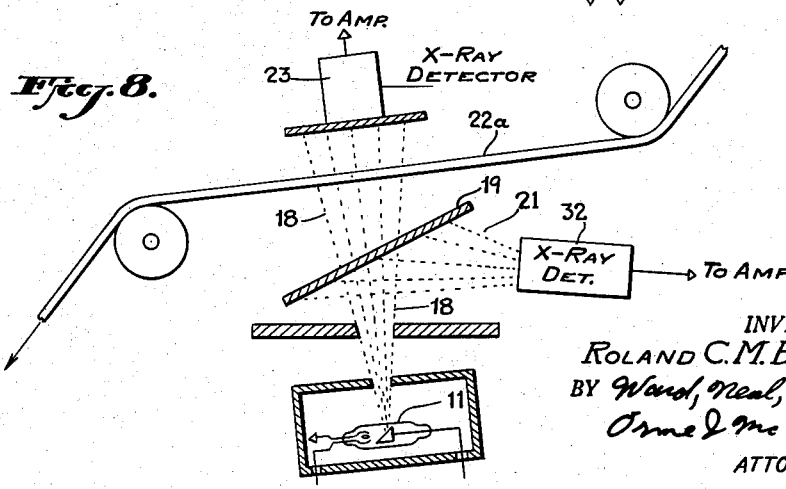
INVENTOR.
ROLAND C. M. BEEH.
BY Ward, Neal, Haselton,
Orme & Mc Elhannon
ATTORNEYS.

Dec. 6, 1960
R. C. BEEH
2,963,585
NON-CONTACTING THICKNESS GAUGES
Filed July 21, 1955
3 Sheets-Sheet 3
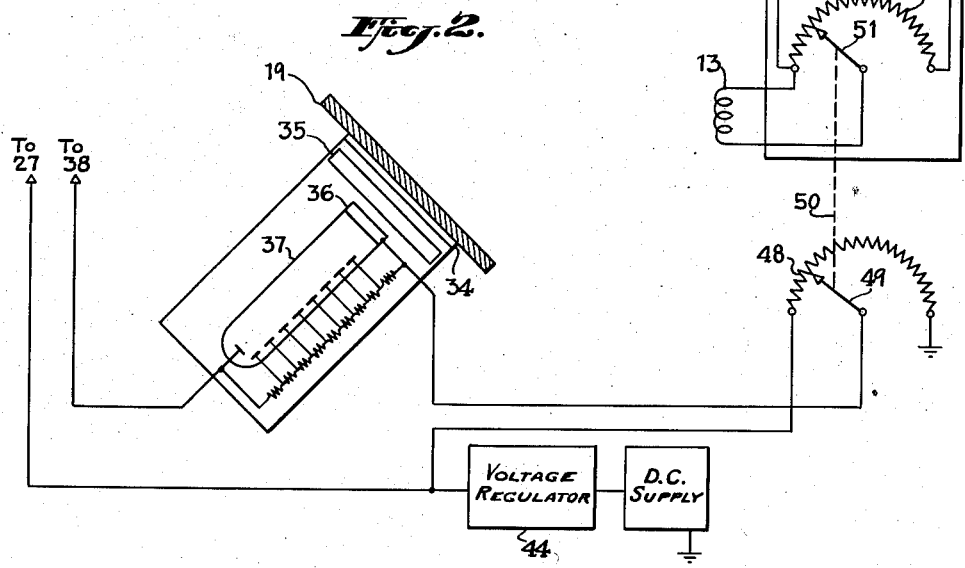
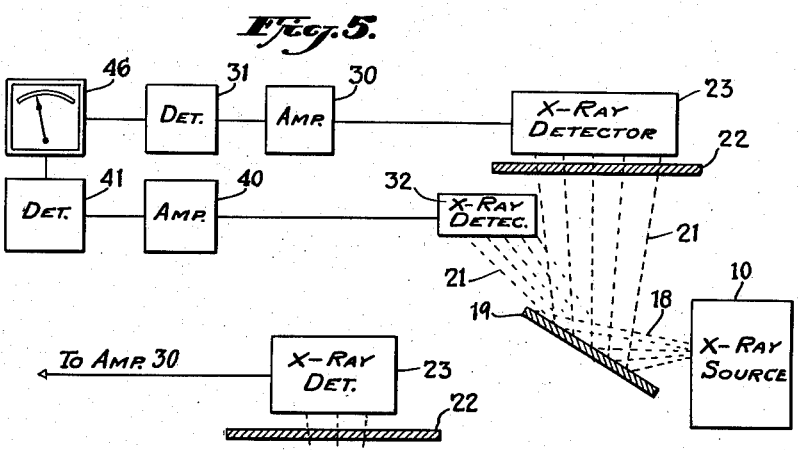
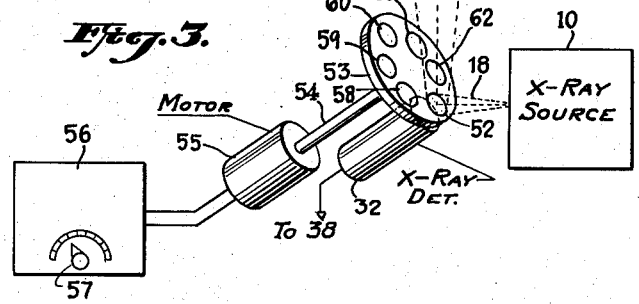
INVENTOR.
ROLAND C. M. BEEH.
BY Ward, Neal, Haselton,
Orme & McClennon
ATTORNEYS.

United States Patent Office 2,963,585
Patented Dec. 6, 1960

2,963,585
NON-CONTACTING THICKNESS GAUGES

Roland C. Beeh, New York, N.Y., assignor, by mesne assignments, to Daystrom, Incorporated, Murray Hill, N.J., a corporation of New Jersey Filed July 21, 1955, Ser. No. 523,500

15 Claims. (Cl. 250—83.3)

This invention relates to non-contacting measuring devices employing radiation, such as X-rays, which penetrates the material being measured.

Non-contacting gauges employing a radiation source, such as a source of X-rays, gamma rays or beta rays, on one side of the material being measured and a detector for such radiation on the opposite side of the material being measured are well known. Such gauges rely for operation on the fact that the material absorbs the radiation in proportion to the thickness thereof.

When the material being measured is relatively thick or is a good absorber of the radiation, the difference in absorption due to changes in thickness of the material is relatively easy to measure, and the errors in measurement due to changes in the intensity of the radiation may be negligible or may be made very small. However, when the materail is relatively thin or is a poor absorber of the radiation, the converse is true. Thus, with the latter materials it has been necessary to employ a detector of high sensitivity and to employ elaborate apparatus to prevent variations in the intensity of the radiation from materially affecting the measurements.

If, for example, the source of radiation is an electrically excited X-ray tube, the intensity of the X-rays may be varied because of several factors which are difficult to control. Thus, if the voltage of the power line changes, the magnitude of the voltage applied to the X-ray tube is varied, causing a variation in the intensity of the X-rays. Even if a voltage regulator is employed there may be changes due to changes occurring in the regulator or due to aging of tubes or other parts in the circuit which energizes the X-ray tube. In addition, the output of the X-ray tube itself will vary even though the applied voltage is constant, the output of the X-ray tube varying with filament temperature, changes in the anode surface, changes in ionization of gases contained in the X-ray tube, etc.

The mass absorption coefficient for X-rays and gamma rays of a given material varies with the wave-length of the radiation which is directed through the material, the coefficient being higher for radiation of longer wave-length. Accordingly, it has been found to be desirable to construct different types of gauges for measuring relatively thick materials and for measuring relatively thin materials. The thick material gauges are generally considered to be those which can measure steel or materials having an equivalent absorption coefficient which range in thickness from .0020 of an inch up to several inches. Gauges which measure materials equivalent in absorption to steel under .0020 of an inch in thickness are generally known as thin material gauges. Thick material gauges employing X-ray or gamma ray sources are constructed so as to produce radiation of relatively short wave-lengths because there is sufficient absorption of radiation of short wave-lengths by thick materials to permit the use of ordinary radiation detectors and to permit the use of relatively simple control circuits for the radiation intensity. However, sources of radiation of short wave-length, such as short wave-length X-rays, make it difficult to measure relatively thin materials because of the low absorption of such radiation by the thin materials and the difficulties mentioned above.

As pointed out above, when the material has a low absorption coefficient a highly sensitive detector must be employed and it is necessary to regulate the intensity of the radiation within a relatively narrow range. The apparatus required under these conditions becomes impractical in commercial units which must withstand the abuse and long runs encountered in mills, and is relatively expensive to construct and maintain.

Although it has been recognized that the use of radiation of longer wave-lengths will reduce the problems encountered in measuring thin materials there are no practical, high intensity, primary sources of long wave-length X-rays at the present time. Thus, even though high intensity X-rays of long wave-length may be generated at the radiator electrode of the X-ray tube, such X-rays are highly absorbed by the tube envelope so that the useful X-rays are of low intensity.

Non-contacting gauges for measuring thin materials which utilize radiation emitting isotopes have been devised. Such isotopes emit beta rays which have a wave-length which is desirable for measuring of thin materials. In addition, no electrical circuits are required in connection with the source so that the problems encountered with such circuits are avoided. The isotopes which have been selected have been chosen so as to provide radiation which decreases exponentially in strength over a period of time which is practical in connection with the measurements being made. However, such gauges have several disadvantages as compared with gauges employing X-rays for the measurement of the thickness of materials. For example, beta rays are difficult to detect and the detectors, such as ionization chambers, which measure the energy which passes through the material, have a relatively slow response. If the material being measured is passed through the gauge at relatively high speeds the gauge will not indicate rapid changes in thickness and therefore the gauges are restricted to applications in which the material to be measured is stationary or fed at slow speeds. In addition, the handling of isotopes requires special care and since the intensity of the radiation decreases with time, means must be provided to compensate for the decrease in intensity and to recalibrate the gauge periodically against samples of known thicknesses.

It is well known that the wave-length of X-rays generated by an X-ray tube is determined by the material of the radiator anode or radiator and the voltage applied to such a tube and hence by suitable selection of the material of the radiator and the operating voltage, the wave-length of the X-rays generated can be selected within predetermined limits. However, because of the absorption characteristics of the tube envelope and because of the voltages required to produce X-rays of high intensity, the wave-length usually is short, e.g. 0.005–0.5 Angstrom, and is in the range best suitable for thick materials or materials with a high absorption coefficient.

It is also well known that a beam of X-rays directed upon a crystalline substance is diffracted, producing diffracted X-rays of the same wave-length as the primary X-rays at angles related to the crystalline structure of the substance and that such a beam also produces other X-rays of a wave-length characteristic of the substance upon which the primary X-rays are directed, of the angle at which the primary X-rays strike the substance and the intensity of the primary X-rays. The latter radiation is called fluorescence, and is found to be of a wave-length which is longer than the wave-length of the primary X-rays. For further details as to the nature and production of diffracted and fluorescence X-rays, reference is made to United States Patent No. 2,521,772.

The X-rays radiated from a target or radiator upon which a primary X-ray beam is directed may be called a secondary radiation or secondary X-rays. Since the intensity of the diffracted radiation may be varied by varying the angle at which the primary radiation strikes the target or radiator and since the wave-length of the fluorescent radiation is determined by the nature of the material from which the radiator is made and the angle at which the primary radiation strikes the radiator and its intensity is determined by the intensity and wave-length of the primary radiation, it will be apparent that the secondary radiation may be made primarily radiation of a wave-length which is longer than the wave-length of the primary radiation and which is within a range particularly suitable for the measurement of thin materials and materials having a low absorption coefficient. Since the radiator may be in air and since there need not be any absorbing material, such as an envelope, between the radiator and the material to be measured, the secondary radiation of longer wave-length which penetrates the material to be measured may be higher in intensity than similar radiation which can be obtained directly from an X-ray tube.

In accordance with my invention, a source of primary radiation is employed to generate secondary radiation and either the primary or the secondary radiation is directed through the material to be measured and is detected after passing through such material. Means are also provided to detect the primary radiation or the secondary radiation which has not passed through said material, and such means is used in conjunction with the means for detecting the radiation which passes through the material to be measured to eliminate, or substantially eliminate, errors in measurement due to variations in the primary radiation. Due to the latter feature, my invention is particularly useful with gauges employing an electrically energized source of primary radiation and hence is particularly useful in gauges employing an electrically energized source of X-rays.

In one embodiment of the invention, the primary radiation source is an X-ray tube, and the X-rays generated by the tube are directed on a radiator which is made from a thin sheet of material which will produce secondary X-rays by fluorescence which have a longer wave-length than the primary X-rays, such wave-length being one for which the material being measured has a high coefficient of absorption. The radiator material is sufficiently thin to permit some of the primary X-rays to pass therethrough and a reference detector is positioned behind the radiator material to detect the primary X-rays which pass therethrough. The secondary X-rays are directed through the material to be measured and a detector of the secondary X-rays is positioned beyond such latter material to detect the secondary X-rays which pass therethrough. The outputs of the two detectors are combined in an indicating device which indicates the thickness of the material being measured, the response of such device being substantially independent of variations in the intensity of the primary X-rays due to variations at the source of primary X-rays.

A second embodiment of the invention is the same as the embodiment described above except that the reference detector is positioned in the path of the secondary X-rays so as to provide a reference output which is controlled by the intensity of the secondary X-rays.

In a third embodiment of the invention, primary X-rays generated by an X-ray tube are directed on a radiator made from a sheet or slab of material which is sufficiently thin or which has a sufficiently low coefficient to permit the primary X-rays to pass therethrough with only a relatively small amount of attenuation. Such primary X-rays after they have passed through the radiator are directed through the material to be measured and are then detected to provide an output which is combined with the output of a reference detector, in the manner described above, to operate an indicating device. The radiator also produces diffracted X-rays or fluorescent X-rays or both and the reference detector is positioned in the path of such secondary X-rays to provide an output for reference purposes.

One object of the invention is to provide a non-contacting thickness gauge which is stable in operation and which is particularly suitable for the measurement of materials known in the art as thin materials.

It is a further object of the invention to provide a non-contacting thickness gauge which employs a source of X-rays and which provides operation as good as or better than similar gauges employing other types of radiation.

Other objects of the invention will be apparent from the following detailed description of different embodiments of the invention which sets forth the manner in which I now prefer to practice the invention and from the accompanying drawings in which:

Fig. 1 is a schematic diagram of one embodiment of the invention;

Fig. 2 is a fragmentary schematic diagram of a modification of the embodiment shown in Fig. 1;

Fig. 3 is a schematic diagram of a modification of the apparatus in the preceding figures;

Fig. 4 is an enlarged, cross-sectional, side elevation view of a portion of the apparatus shown in Fig. 3;

Fig. 5 is a schematic diagram of a further embodiment of the invention;

Fig. 6 is a schematic diagram illustrating a modification of the means for generating primary X-rays;

Fig. 7 is a schematic diagram illustrating a modification of the X-ray radiator and illustrating means for directing the secondary X-rays which may be employed in connection with the various embodiments of the invention; and Fig. 8 is a schematic diagram illustrating a further embodiment of the invention.

The embodiment of the invention shown in Fig. 1 comprises a radiation source 10 which includes an X-ray tube 11 which is energized by the output of a transformer 12. The primary winding 13 of the transformer 12 is connected to an alternating current source 14 by means of a potentiometer 15 which permits adjustment of the voltages applied to the X-ray tube 11.

The X-ray tube 11 and its associated energizing apparatus is surrounded by a housing 16 which is made of a material such as lead which absorbs X-rays issuing from the tube 11 other than those that pass through the window or aperture 17 in one wall of the housing 16. The X-ray tube 11 and the energizing voltages may be chosen so that the wave-length of the X-rays generated in the tube 11 is approximately 0.5 Angstrom.

The X-rays 18, indicated by the dotted lines, which pass through the aperture or the window 17 are directed on a radiator 19 whose surface 20 is disposed at an angle with respect to the path of the primary X-rays 18 and preferably the surface 20 is at an angle of approximately 45° with respect to the center of the beam of X-rays 18. The radiator 19 preferably is made of a material which will produce fluorescence radiation having a wave-length longer than the wave-length of the primary X-rays 18 and may, for example, be a sheet of copper which will produce X-rays by fluorescence having a wave-length of approximately 1.537 Angstroms.

When the primary X-rays 18 strike the radiator 19 secondary X-rays, indicated by the dotted lines 21, and including both diffracted X-rays of the same wave-length as the primary X-rays 18 and X-rays having a wave-length longer than the primary X-rays 18, will be radiated from the surface 20. Preferably, the angle of the surface 20 with respect to the primary X-rays 18 is such that the secondary X-rays 21 are predominantly X-rays having a wave-length longer than the primary X-rays 18 and such secondary X-rays will be directed along the paths indicated by the dotted lines 21. The material 22 whose thickness is to be measured is placed in the path of the secondary X-rays 21 and absorbs such secondary X-rays 21 in an amount dependent upon the absorption coefficient of the material 22 for such X-rays and upon the thickness of the material 22.

Means 23 for generating an electrical signal in response to the impingement of secondary X-rays 21 thereon is disposed behind the material 22 with respect to the radiator 19. Such means 23 comprises a light-proof enclosure 24 having an X-ray penetrable wall 25 and comprises a screen 26 of material which fluoresces when struck by the secondary X-rays 21 and produces light which is detectable by the cathode 27 of a photo-multiplier tube 28. The material for the screen 26 preferably is chosen so as to have the maximum sensitivity for radiation having the wave-length of the secondary X-rays 21. The electrical output signal of the photo-multiplier 28 is developed across a resistor 29 which is connected to the input of an amplifier 30 whose output is connected to the input of a peak detector 31.

Similar means 32 for generating an electrical signal in response to the impingement of X-rays thereon is disposed behind the radiator 19 with respect to the X-ray source 10. The means 32 comprises a light-proof enclosure 33 having an X-ray penetrable wall 34, and a screen 35 mounted adjacent the wall 34, the screen 35 being made, at least in part, of a material which fluoresces and produces light when X-rays strike the screen 35. The material for the screen 35 preferably is chosen so as to have the maximum sensitivity for radiation having the wave-length of the primary X-rays 18. The light generated by the screen 35 is detected by the cathode 36 of the photo-multiplier tube 37 and the electrical output signal developed by the tube 37 appears across a potentiometer 38.

A portion of the signal developed across the potentiometer 38, the magnitude of the portion being determined by the position of the arm 39, is supplied to the input of the amplifier 40 whose output is connected to the input of a peak detector 41.

Regulated D.C. voltages are supplied to the photo-multiplier tubes 28 and 37 and to the amplifiers 30 and 40 and to the peak detectors 31 and 41 by the D.C. supplies 42 and 43 and the voltage regulators 44 and 45.

The peak detectors 31 and 41 provide electrical signals at their outputs which are dependent upon the intensities of the X-rays striking the screens 26 and 35 respectively. The outputs of the detectors 31 and 41 are connected to an indicating device 46, which may, for example, be a meter of the zero-center type having a needle 47, in opposing relationship so that the output of detector 31 deflects the needle 47 in a first direction when the output of detector 41 deflects the needle 47 in an opposite direction. Thus, points of the same polarity in the detectors 31 and 41 may be connected to different terminals on the indicating device 46 so as to produce deflection of the needle 47 in a direction dependent upon the relative magnitudes of the output signals of the detectors 31 and 41.

As pointed out above, the radiator 19 is preferably made of a material such as copper so as to produce secondary X-rays 21 having a wave-length longer than the primary X-rays 18. In addition, the radiator 19 is made relatively thin, e.g. 0.001 inch, so that there is relatively little absorption of the primary X-rays 18 which strike the radiator 19. The primary X-rays 18 are, therefore, permitted to pass through the radiator 19 and such X-rays 18 which penetrate the radiator 19 excite the screen 35.

Materials other than copper may also be employed for the radiator 19. For example, the radiator material may be one of the following materials which provide secondary X-rays having the wave-lengths indicated:

Material:                 Wave-length, Angstroms
- Magnesium _____ 9.869
- Aluminum _____ 8.3205
- Beryllium _____ 115.7
- Titanium _____ 2.74681
- Iron _____ 1.936012
- Nickel _____ 1.65835
- Copper _____ 1.541232

However, in view of the fact that it is desirable to make the radiator relatively thin and of uniform thickness, the preferred materials are copper, aluminum, magnesium, and beryllium, these latter materials being easy to fabricate into thin, uniform sheets.

As pointed out above, every material has an absorption coefficient which varies with the wave-length of the radiation directed against the material and, in addition, each material has a maximum absorption coefficient at certain wave-lengths. For example, the following materials have their maximum absorption coefficients at the wave-lengths indicated:

| Material | Wave-length, Angstroms | Absorption Coefficient |
|---|---|---|
| Beryllium | 2.5 | 6.1 |
| Iron | 4.36 | 610 |
| Copper | 11.88 | 7,550 |
| Aluminum | 7.94 | 3,700 |
| Nickel | 11.88 | 6,900 |
| Zinc | 4.36 | 910 |
| Carbon | 44.6 | 2,170 |

The manner in which the absorption coefficient for several materials varies with the wave-length may be seen from the following table:

| X-ray Wave-length, Angstroms | Material Absorption Coefficient | | | | | | |
|---|---|---|---|---|---|---|---|
| | Be | Fe | Cu | Al | Ni | Zn | C |
| 4.36 | | 610 | 760 | 815 | 715 | 910 | 97.8 |
| 1.389 | 1.25 | 252 | 38.5 | 36.8 | 275 | 45.2 | 3.35 |
| 1.000 | .55 | 100 | 130 | 14.12 | 121 | 145 | 1.36 |
| .497 | .21 | 13.9 | 18.4 | 1.9 | 17.9 | 21.0 | .315 |

The absorption coefficient of other materials, such as paper, plastics, etc. varies according to the chemical composition of these materials in a manner comparable to the one described above for elements. However, small changes in such composition may greatly vary the wave-length for maximum absorption. For example, the silver bromine in a photographic paper or the aluminum compounds added to a tracing paper as chemical fillers will provide a coefficient which is much larger than that of the base paper. For such materials, the optimum wave-length is situated between 5 A. and .9 A.

Thus, it will be apparent that by suitably selecting the wave-length of the radiation which is directed through the material to be measured, it is possible to produce a large deflection of the needle 47 of the indicating device 46 for a small change in the thickness of the material being measured. For example, if the wave-length employed for measuring the thickness of a sheet of aluminum is 1.389 Angstroms rather than .497 Angstrom, a given change in the thickness of the aluminum will produce an electrical signal change almost twenty times greater with the longer wave-length than the electrical signal change produced with the shorter wave-length.

To operate the apparatus shown in Fig. 1, a radiator 19 is selected which will provide the desired wave-length of the secondary X-rays. A sheet of material of the standard thickness, i.e. the nominal thickness of the material to be measured subsequently, is placed in the path of the secondary X-rays 21 in place of the sheet of material 22 shown in Fig. 1. The electrical circuits are then energized, causing the generation of the primary X-rays 18 and the secondary X-rays 21. Under these conditions if the arm 39 of the potentiometer 38 has not been properly adjusted, the needle 47 will read to one side or the other of the central or zero position on the indicating device 46. For example, if the output of the peak detector 31 is greater than the peak detector 41, the needle 47 would be in a position to the right of the central position shown in Fig. 1 and vice versa. The arm 39 is adjusted so as to vary the input to the amplifier 40 and hence the output of the peak detector 41 until the needle 47 is in the center position shown in Fig. 1.

The X-ray tube 11 is then de-energized or a shutter is placed in the beam of X-rays 18 so as to prevent such X-rays 18 from striking the radiator 19. The material 22 whose thickness is to be measured is placed in the position shown in Fig. 1 and the X-ray tube 11 is energized, or the shutter is removed, permitting the X-rays 18 to strike the radiator 19 and causing generation of the secondary X-rays 21. The needle 47 will move to the center position shown if the thickness of the material 22 is the same as the thickness of the standard above described. On the other hand, if the thickness of the material 22 differs from the thickness of the standard, the needle 47 will move to a position either to the right or to the left of the center position depending upon whether the material 22 is thicker or thinner than the standard. The scale of the indicating device 46 may be calibrated so as to indicate the difference between the thickness of the material 22 and the thickness of the standard in either percentage values or thousandths of an inch.

It will be noted from the description of the apparatus shown in Fig. 1 that the output of the peak detector 31, which is dependent upon the absorption coefficient and the thickness of the material 22 which is being measured, is balanced against the output of the peak detector 41 which is dependent upon the intensity of the X-rays 18 striking the screen 35 of the means 32 which may be considered as part of a reference detector.

Let it be assumed that for one of the causes set forth above, e.g., variations in the line voltage, changes in the radiator electrode of the X-ray tube 11, etc., the intensity of the primary X-rays 18 is varied. It will be apparent that the energy of the X-rays detected at the screen 35 may be represented by the following equation:

$$(1) \qquad E_1 = E \pm e - \left(B + \frac{1}{d^2}\right)$$

where:

$E_1$ represents the energy of the X-rays striking the screen 35.

E represents the energy of the X-rays 18 leaving the radiator electrode of the X-ray tube 11.

e represents the variation of the energy of the X-rays 18 caused by one of the above-mentioned variations or changes.

B represents the absorption of the primary X-rays 18 caused by the radiator 19.

d represents the distance between the radiator electrode of the X-ray tube 11 and the light producing material on the screen 35.

In the absence of the material 22, the energy of the X-rays received by the screen 26 may be represented by the following equation:

$$(2) \qquad E_2 = E \pm e - \left(\frac{1}{(d')^2} + K\frac{1}{(d'')^2}\right)$$

where:

$E_2$ represents the energy of the X-rays 21 at the screen 26.

E represents the energy of the X-rays 18 leaving the radiator electrode of the X-ray tube 11.

e represents the variation of the energy of the X-rays 18 caused by one of the above-mentioned variations or changes.

d' represents the distance between the target electrode of the X-ray tube 11 and the surface of the radiator 19 facing the X-ray tube 11.

d'' represents the distance between the surface of the radiator 19 facing the X-ray tube 11 and the light producing material on the screen 26.

K is a factor representing the loss in energy caused in the generation of the secondary X-rays 21.

When the material 22 is inserted in the beam 21, Equation 2 becomes:

$$(3) \qquad E_2 = E \pm e - \left(\frac{1}{(d')^2} + K\frac{1}{(d'')^2} + F\right)$$

where:

F is a factor representing the energy absorbed by the material 22.

When the output from peak detector 31 is equal to the output from peak detector 41, and hence when the needle 47 is in its zero or center position, then:

$$(4) \qquad K_1 E_1 = K_2 E_2$$

where:

$K_1$ is a factor representing the transformation of the energy $E_1$ into a voltage at the output of the peak detector 41.

$K_2$ is a factor representing the transformation of the energy $E_2$ into a voltage at the output of the peak detector 31.

Substituting the value of $E_1$ and $E_2$ from Equations 1 and 3 provides the following equation:

$$(5) \qquad K_1\left(B + \frac{1}{d^2}\right) = K_2\left(\frac{1}{(d')^2} + K\frac{1}{(d'')^2} + F\right)$$

Accordingly, it may be seen from the above equation that the reading of the indicating device 46 is independent of the variations in energy of the primary X-rays 18 and hence is independent of the aforementioned causes of variations in the X-ray sources.

Also, it will be apparent from the above that since the factors $K_1$ and $K_2$ depend upon the gains or losses in the circuits and apparatus between the screens 26 and 35 and the indicating device 46, it is possible to satisfy the above equations by adjusting such gains or losses. In the embodiment shown in Fig. 1, the factor $K_1$ is varied by adjustment of the arm 39 of the potentiometer 38.

In the embodiment shown in Fig. 2, the adjustment of the value of the factor $K_1$ and hence the reading of the indicating device 46 is adjusted by varying the voltage on the electrodes of the photo-multiplier tube 37. In addition, the control for varying the voltage and hence the gain of the photo-multiplier tube 37 is ganged with the poentiometer which controls the voltage on the X-ray tube 11 so that when the voltage on the X-ray tube 11 is changed, the gain of the photo-multiplier tube 37 is is simultaneously changed to compensate for any non-compensating changes in the two paths of the detecting and amplifying systems due to changes in the voltage on the X-ray tube 11. For example, when the voltage on the X-ray tube 11 is changed, the wavelength of the X-rays 18 is also changed. Large variations in the voltage of the X-ray generator 18 may not be accompanied by linear changes in the spectrum of the emitted X-rays 21, in the light output of the screens 26 and 35 or in the output of the photocathodes 27 and 36. Furthermore, changes in the wave-length of the X-rays 18 may also produce similar effects and the ganging of the control which adjusts the voltage on the photo-multiplier tube 37 with the control which adjusts the voltage on the X-ray tube 11 permits automatic compensation for such non-linear changes.

The diagram in Fig. 2 illustrates only that portion of the apparatus of Fig. 1 required for an understanding of the modification, the apparatus not shown in Fig. 2 being the same as the apparatus shown in Fig. 1. In Fig. 2, the energizing voltage for the electrodes of the photo-multiplier tube 37 is controlled by a potentiometer 48 which is connected between the voltage regulator 44 and ground. The potentiometer 48 has an arm 49 which is connected to the photo cathode 36 and which ganged as indicated by the dotted line 50 to the arm 51 of the potentiometer 15. When the arm 49 is varied in position because of variation of position of the arm 51, the voltage applied to the electrodes of the photo-multiplier tube 37 is varied, causing a change in the gain in the photo-multiplier tube 37. It will be seen that by suitable ganging of the arms 49 and 51, or by suitable selection of the characteristic of the potentiometer 48 or both, the gain of the photo-multiplier 37 may be varied in any desired relationship with respect to the variation of the voltage applied to the X-ray tube 11 and hence the factor $K_1$ may be varied in such a manner as to compensate for undesired changes produced when the voltage on the X-ray tube 11 is varied.

If it is desired to make the apparatus of the invention suitable for the measurement of different materials and if it is desired to make the changing of the wave-length of the secondary X-rays relatively simple, the apparatus shown in Fig. 3 may be employed in connection with the embodiments previously described. In Fig. 3, the primary X-rays 18 from the source 10 are directed on a piece or disc of radiator material 52 mounted on a turntable or wheel 53 which is rotatable by the shaft 54 of a motor device 55. The position of the shaft 54 and hence of the wheel 53 is determined by the position controlling means 56 having a position control 57. The motor device 55 and the associated position controlling means 56 are well known and need not be described in further detail.

The disc 52 acts as a radiator in the same manner as the radiator 19 and causes the production or generation of secondary X-rays 21 which are directed through the material 22 and which are detected by means 23. The primary X-rays 18 which pass through the disc 52 are detected by the means 32.

A plurality of discs 58—62 are also mounted on the wheel 53, each of the discs 58—62 being made of a material which is different from the material of the other discs and the material of disc 52. For example, the disc 52 may be made of copper, the disc 58 may be made of aluminum, the disc 59 may be made of magnesium, etc. Accordingly, by suitably selecting the disc which is struck by the primary X-rays 18, the wave-length of the secondary X-rays 21 may be selected to be the value best suited for the measurement of the thickness of the material 22.

The wheel 53 and the discs mounted thereon are shown in greater detail in Fig. 4. As shown in Fig. 4, the wheel 53 has a plurality of apertures 63, 64, etc. therein into which apertures are fitted the pieces or discs 52, 58, etc. The body of the wheel 53 surrounding the apertures 63, 64, etc. may be made of relatively light material although, if desired, it may be made of a material which has a high absorption coefficient for the primary X-rays, lead being one example of such latter material. If the beam of primary X-rays 18 is confined to the area of the disc or radiator, such as disc 52, it is not necessary to make the wheel 53 of material which has an absorption coefficient for the primary X-rays 18. However, if it is not possible or desired to so restrict the primary X-rays 18 and if it is desired to prevent the primary X-rays 18 other than those striking the discs from passing to the rear of the wheel 53, the wheel 53 may be made of a material which has a high absorption coefficient for the X-rays 18.

In the previously described embodiments, the reference detector or means 32 is mounted behind the radiator so that the reference detector is excited or energized by the primary X-rays 18 which pass through the radiator. If sufficient space is available or if the loss of intensity due to insertion of the reference detector in the path of the secondary X-rays 21 can be tolerated, the reference detector may be mounted in the path of the secondary X-rays in the manner shown in Fig. 5. In Fig. 5, the primary X-rays 18 from the source 10 are directed on the radiator 19 which is positioned as described in connection with Fig. 1. The secondary X-rays 21 which are radiated from the radiator 19 are directed through the material 22 and are detected by the means 23. The output of the means 23 is connected to the amplifier 30, the peak detector 31 and the indicating device 46 in the manner described in connection with Fig. 1.

The reference detector or means 32 is also mounted in the path of the secondary X-rays 21 and is connected to the amplifier 40, the peak detector 41 and the indicating device 46 in the manner described in connection with Fig. 1. Preferably, the detector 32 is mounted in the path of X-rays produced by fluorescence so that it will measure and compensate for any variation in the longer wave-length X-rays which are the ones which pass through the material 22. However, if desired, the detector 32 may be positioned in a well known manner in respect to the radiator 19 so as to be energized primarily by diffracted X-rays which have the same wave-length as the primary X-rays 18.

In the embodiments previously described, it has been assumed that the X-ray tube 11 is excited by alternating current which causes the X-rays to be generated in pulses resulting from the positive peaks of the alternating current and having the frequency of the alternating current. Since the alternating current usually has the shape of a sine wave, the wave-length of the X-rays varies during the voltage rise occurring for each cycle of the applied voltage. Thus, the primary X-rays do not have a single wave-length but instead the X-rays generated during each cycle have several different wave-lengths within a predetermined band. It may, therefore, be desirable to substitute the arrangement shown in Fig. 6 for the X-ray source and energizing apparatus, for the sources described in connection with the preceding embodiments.

In Fig. 6, the electrodes of the X-ray tube 11 are connected to a D.C. voltage supply 65 so that the X-rays generated by the tube 11 are substantially of a single wave-length. To simplify the amplification and detection processes in the remaining circuits of the apparatus, the primary X-rays 18 are interrupted at a predetermined rate by a conventional wheel or chopper 66 which is turned by a motor 67. The body of the chopper 66 is made of a material which has a high absorption coefficient for the primary X-rays 18 and it is provided with a plurality of apertures 68 which permit the X-rays 18 to pass and strike the radiator 19. As the chopper 66 is rotated, the X-rays 18 are alternately absorbed and passed, causing excitation or energization of the means 23 and 32 at a frequency which is determined by the speed of rotation of the chopper 66 and the spacing and number of apertures 68.

As pointed out above, the wave-length of the X-rays produced by fluorescence is dependent upon the wave-length of the primary X-rays and upon the angle at which the primary X-rays strike the surface of the radiator 19 and the relationship may be defined by the following equation:

$$(6) \qquad w = w_1 \frac{h}{mc}(1 - \cos a)$$

where:

$w$ represents the wave-length of the X-rays produced by fluorescence.

$w_1$ represents the wave-length of the primary X-rays.
$h$ represents Planck's constant.
$m$ represents the mass of an electron.
$c$ represents the velocity of light.
$a$ represents the angle between the path of the X-rays and the surface which is struck by the X-ray.

It has been found from experience that an angle of 45° between the path of the primary X-rays and the surface of the radiator 19 gives excellent results. A radiator with a plane surface is satisfactory if the paths of all the X-rays are parallel to each other but as a practical matter the paths of the X-rays lie within a cone having its apex substantially at the radiation producing electrode of the X-ray tube 11. Accordingly, if the radiator 19 is adjusted so that its surface forms an angle of 45° with the center of the beam, the X-rays following paths removed from the center of the beam strike the surface of the radiator 19 at angles other than 45°. However, by suitably shaping the surface of the radiator 19 which faces the sources of the X-rays, it is possible to have substantially all of the primary X-rays strike the radiator at an angle of substantially 45°.

In Fig. 7, the radiator 69 shown therein has a concave, dish-shaped surface 70 which is shaped so that substantially all of the primary X-rays 18 originating at the X-ray tube 11 strike the surface 70 at an angle of substantially 45°, the radiator 69 being shown in cross-section in Fig. 7. Assuming that the source of the primary X-rays 18 is at point source, it can be shown by geometry that the shape of the surface 70, when viewed in cross-section and in a plane passing through the center of the radiator 69 should conform to a logarithmic curve having the formula:

(7) $$p = be^{na}$$

where:

$p$ represents the length of a vector extending from the radiator electrode of tube 11 to the surface 70.
$b$ represents a constant.
$e$ represents the natural logarithm base.
$n$ represents a constant.
$a$ represents the angle between the above-mentioned vector and the vector at the point of beginning.

The angle between each of the aforementioned vectors and the tangent to the curve at the point of intersection of the vector with the curve is constant and may be made equal to 45°, such angle being related to the slope of the tangent as follows:

(8) $$\tan t = \frac{\tan a + \tan 45°}{1 - \tan a \tan 45°}$$

where $t$ represents the angle between the tangent and the vector at the point of beginning and $a$ is defined above.

In some cases it may be desirable to collimate the secondary X-rays and it is for this purpose that the plates or sheets 71 and 72 shown in Fig. 7 have been provided. The collimating, highly polished plates 71 and 72 may be made of steel or nickel, for example, and are placed so as to reflect secondary X-rays 21 which, when they leave the surface 70, are not directed toward the detector 23 so that they are detected thereby. The surfaces of the plates 71 and 72 should be disposed at a very small angle with respect to the secondary X-rays 21 which it is desired to reflect toward the detector 23 and the angle of the surfaces of the plates 71 and 72 with respect to the paths of the secondary X-rays 21 which it is desired to reflect should be less than 3 minutes. Secondary X-rays 21 which strike the surfaces of the plates 71 and 72 at an angle greater than 3 minutes are absorbed by the plates 71 and 72 or produce secondary radiation.

In the preceding embodiments, the elimination of errors due to the variations in the intensity of the primary X-rays 18 may still be accomplished if diffracted X-rays rather than X-rays produced by fluorescence are directed through the material 22, but such an arrangement is not preferred because the positioning of the radiator 19 with respect to the primary X-rays is relatively critical and because the production of X-rays by fluorescence cannot be avoided, this latter effect making it difficult to provide an arrangement whereby the secondary X-rays passing through the material 22 are predominantly diffracted X-rays. Furthermore, the diffracted X-rays have the same wave-length as the primary X-rays and, therefore, the advantages of using longer wave-length X-rays are not obtained.

On the other hand, since the apparatus of the invention is substantially independent of variations in the intensity of the primary X-rays, it is possible to have a relatively high gain detecting system and still have sufficient stability to permit the measurement of thin materials even though the wave-length of the X-rays which penetrate such thin materials may be relatively short and hence may be of a wave-length for which the material has a relatively low absorption coefficient. Furthermore, in some cases the difficulties encountered due to the random nature of the emission of secondary X-rays may be of sufficient importance to warrant the use of the embodiment shown in Fig. 8.

In Fig. 8, the primary X-rays 18 generated by the X-ray tube 11 are directed on the radiator 19 causing the generation of secondary X-rays 21. The radiator 19 is made of one of the materials previously mentioned and may be made of copper. The radiator 19 is made relatively thin, e.g. .001 of an inch so that the primary X-rays 18 pass therethrough with only a small loss in intensity.

The embodiment shown in Fig. 8 differs from the preceding embodiments in that the material 22a to be measured is placed in the path of the primary X-rays 18 rather than in the path of the secondary X-rays 21. In addition, the detector 32 is placed in the path of the secondary X-rays 21 rather than in the path of the primary X-rays 18 and the measuring detector 23 is placed in the path of the primary X-rays 18 which penetrate the material 22a. However, it will be noted that even though the positions of the detectors and the material to be measured are reversed from those shown in Fig. 1, the system is self-compensating, that is, any variations in the output of the detector 23 due to variations in the intensity of the X-rays 18 generated by the tube 11 are compensated for by the output of the reference detector 32 which is energized by the secondary X-rays 21 whose intensity varies with the intensity of the primary X-rays 18.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

What is claimed as new and desired to be secured by Letters Patent is:

1. A non-contacting, X-ray gauge comprising means for producing primary X-rays, means stably responsive to said primary X-rays for producing secondary X-rays having a wave-length longer than the wave-length of said primary X-rays, means in the path of said secondary X-rays responsive in a manner dependent upon the intensity of said secondary X-rays, and means in the path of one of said primary and said secondary X-rays responsive in a manner dependent upon the intensity of said one X-rays.

2. A non-contacting, X-ray gauge comprising means for producing primary X-rays, means stably responsive to said primary X-rays for producing secondary X-rays having a wave-length longer than the wave-length of said primary X-rays, means in the path of said secondary X-rays for producing an electrical signal dependent upon the intensity of said secondary X-rays, means in the path of one of said primary and said secondary X-rays for producing an electrical signal dependent upon the intensity of said one X-rays, and means responsive to said signals connected to said signal producing means.

3. A non-contacting gauge comprising means for producing primary rays, a radiator of a material adapted to radiate substantially stabilized secondary rays when said primary rays are directed thereon, said radiator being disposed in the path of said primary rays, first means responsive to one of said primary and said secondary rays, said first means being mounted in the path of said one rays, and second means responsive to said secondary rays, said second means being mounted in the path of said secondary rays.

4. A non-contacting gauge comprising means for producing primary rays, a radiator of a material adapted to radiate substantially stabilized secondary rays when said primary rays are directed thereon, said radiator being disposed in the path of said primary rays, first generating means responsive to one of said primary and said secondary rays for generating an electrical signal in response to impingement of said one rays thereon, said first generating means being mounted in the path of said one rays, second generating means responsive to said secondary rays for generating an electrical signal in response to impingement of said secondary rays thereon, said second generating means being mounted in the path of said secondary rays, signal responsive means and means for connecting said first and said second generating mean to said signal responsive means.

5. An X-ray gauge comprising means for producing primary X-rays, a radiator of a material adapted to radiate substantially stabilized secondary X-rays when said primary X-rays are directed thereon, said radiator being disposed in the path of said primary X-rays, first generating means responsive to one of said primary and said secondary X-rays for generating an electrical signal in response to impingement of said one X-rays thereon, said first generating means being mounted in the path of said one X-rays, second generating means responsive to said secondary X-rays for generatnig an electrical signal in response to impingement of said secondary X-rays thereon, said second generating means being mounted in the path of said secondary X-rays, signal responsive means and means for connecting said first and said second generating means to said signal responsive means.

6. An X-ray gauge comprising means for producing primary X-rays, a radiator of a material adapted to radiate substantially stabilized secondary X-rays when excited by said primary X-rays, said radiator being disposed in the path of said primary X-rays and having a surface facing said means which is disposed at an angle to the path of said primary X-rays, first generating means responsive to one of said primary and said secondary X-rays for generating an electrical signal in response to impingement of said one X-rays thereon, said first generating means being mounted in the path of said one X-rays, second generating means responsive to said secondary X-rays for generating an electrical signal in response to impingement of said secondary X-rays thereon, said second generating means being mounted in the path of said secondary X-rays, signal indicating means and means for connecting said first and said second generating means to said indicating means.

7. An X-ray gauge comprising means for producing primary X-rays, a radiator of a material adapted to radiate secondary X-rays having a wave-length longer than the wave-length of said primary X-rays when excited by by said primary X-rays, said radiator being disposed in the path of said primary X-rays and having a surface facing said means which is disposed at an angle to the path of said primary X-rays, first generating means responsive to said primary X-rays for generating an electrical signal in response to impingement of said primary X-rays thereon, said first generating means being mounted in the path of said primary X-rays, second generating means responsive to said secondary X-rays for generating an electrical signal in response to impingement of said secondary X-rays thereon, said second generating means being mounted in the path of said secondary X-rays, signal indicating means and means for connecting said first and said second generating means to said indicating means.

8. An X-ray gauge comprising means for producing primary X-rays, a radiator of a material adapted to radiate secondary X-rays having a wave-length longer than the wave-length of said primary X-rays when excited by said primary X-rays, said radiator being disposed in the path of said primary X-rays and having a surface facing said means which is disposed at an angle to the path of said primary X-rays, first generating means responsive to said primary X-rays for generating an electrical signal in response to impingement of said primary X-rays thereon, said first generating means being mounted behind said radiator with respect to said first-mentioned means and in the path of said primary X-rays which penetrate said radiator, second generating means responsive to said secondary X-rays for generating an electrical signal in response to impingement of said secondary X-rays thereon, said second generating means being mounted in the path of said secondary X-rays and being spaced from said radiator to permit the passage of material to be measured between said radiator and said second generating means, signal indicating means and means for connecting said first and said second generating means to said indicating means in opposing relationship whereby said indicating means is operated in one manner by the output of one of said generating means and is operated in an opposite manner by the output of the other of said generating means.

9. An X-ray gauge comprising a source of primary X-rays, a radiator of a material adapted to radiate secondary X-rays having a wave-length longer than the wave-length of said primary X-rays when excited by said primary X-rays, said radiator being disposed in the path of said primary X-rays and having a surface facing said source which is disposed at an angle to the path of said primary X-rays, first generating means responsive to said primary X-rays for generating an electrical signal in response to impingement of said primary X-rays thereon, said first generating means being mounted behind said radiator with respect to said source and in the path of said primary X-rays which penetrate said radiator, second generating means responsive to said secondary X-rays for generating an electrical signal in response to impingement of said secondary X-rays thereon, said second generating means being mounted in the path of said secondary X-rays and being spaced from said radiator to permit the passage of material to be measured between said radiator and said second generating means, signal indicating means, means for connecting said first and said second generating means to said indicating means in opposing relationship whereby said indicating means is operated in one manner by the output of one of said generating means and is operated in an opposite manner by the output of the other of said generating means, and means connected to one of said generating means for adjusting the magnitude of at least one of the signals supplied to said indicating means.

10. An X-ray gauge comprising means for producing primary X-rays, a radiator of a material adapted to radiate secondary X-rays having a wave-length longer than the wave-length of said primary X-rays when excited by said primary X-rays, said radiator being disposed in the path of said primary X-rays and having a surface facing said means which is disposed at an angle to the path of said primary X-rays, first generating means responsive to said primary X-rays for generating an electrical signal in response to impingement of said primary X-rays thereon, said first generating means being mounted behind said radiator with respect to said first-mentioned means and in the path of said primary X-rays which penetrate said radiator, first amplifying and detecting means connected to said first means for amplifying and detecting said signal, said first amplifying means being adjustable, second generating means responsive to said secondary X-rays for generating an electrical signal in response to impingement of said secondary X-rays thereon, said second generating means being mounted in the path of said secondary X-rays and being spaced from said radiator to permit the passage of material to be measured between said radiator and said second generating means, second amplifying and detecting means connected to said second generating means for amplifying and detecting said last-mentioned signal, signal indicating means and means for connecting said first and said second detecting means to said indicating means in opposing relationship whereby said indicating means is operated in one manner by the output of one of said detecting means and is operated in an opposite manner by the output of the other of said detecting means.

11. An X-ray gauge comprising means for generating primary X-rays, a radiator of a material adapted to radiate substantially stabilized secondary X-rays when said primary X-rays are directed thereon, said radiator being disposed in the path of said primary X-rays, first and second generating means responsive to said secondary X-rays for generating electrical signals in response to impingement of said secondary X-rays thereon, said first and second generating means being mounted in the path of said secondary X-rays, and means responsive to said signals connected to said first and said second generating means.

12. An X-ray gauge comprising means for generating primary X-rays, a radiator of a material adapted to radiate substantially stabilized secondary X-rays when said primary X-rays are directed thereon, said radiator being disposed in the path of said primary X-rays and having a surface facing said means which is disposed at an angle to the path of said primary X-rays, first and second generating means responsive to said secondary X-rays for generating electrical signals in response to impingement of said secondary X-rays thereon, said first and second generating means being mounted in the path of said secondary X-rays, indicating means and means for connecting said first and said second generating means to said indicating means in opposing relationship whereby said indicating means is operated in one manner by the output of one of said detecting means and is operated in an opposite manner by the output of the other of said detecting means.

13. An X-ray gauge comprising means for generating primary X-rays, a radiator of a material adapted to radiate substantially stabilized secondary X-rays having a wave-length longer than the wave-length of said primary X-rays when excited by said primary X-rays, said radiator being disposed in the path of said primary X-rays and having a surface facing said means which is disposed at an angle to the path of said primary X-rays, first and second generating means responsive to said secondary X-rays for generating electrical signals in response to impingement of said secondary X-rays thereon, said first and second generating means being mounted in the path of said secondary X-rays and one of said first and second generating means being spaced from said radiator to permit the passage of material to be measured between said radiator and said one generating means, first and second amplifying and detecting means connected to said first and second generating means for amplifying and detecting the signals generated thereby, indicating means and means for connecting said first and said second detecting means to said indicating means in opposing relationship whereby said indicating means is operated in one manner by the output of one of said detecting means and is operated in an opposite manner by the output of the other of said detecting means.

14. A non-contacting ray gauge comprising means for producing primary rays directed along a predetermined, substantially linear path, means mounted in said path and responsive to said primary rays or producing secondary rays having a wave-length longer than the wave-length of said primary rays and directed along a different predetermined path, means in the path of said secondary rays responsive thereto, means in the path of said primary rays responsive thereto and means connected to said two last-mentioned means and jointly controlled thereby.

15. A non-contacting, X-ray gauge comprising means for producing primary X-rays directed along a predetermined, substantially linear path, means mounted in said path and responsive to said primary X-rays for producing secondary X-rays having a wave-length longer than the wave-length of said primary X-rays and directed along a different predetermined path, means in the path of said secondary X-rays responsive in a manner dependent upon the intensity of said secondary X-rays, means in the path of said primary X-rays responsive in a manner dependent upon the intensity of said primary X-rays and means connected to said two last-mentioned means and jointly controlled thereby.

References Cited in the file of this patent
UNITED STATES PATENTS

| | | |
|---|---|---|
| 2,318,667 | Bruce | May 11, 1943 |
| 2,442,752 | Armstrong | June 8, 1948 |
| 2,602,142 | Meloy | July 1, 1952 |